(12) United States Patent
Bokaris et al.

(10) Patent No.: US 11,818,515 B2
(45) Date of Patent: Nov. 14, 2023

(54) SYSTEMS, DEVICES, AND METHODS FOR PROJECTING DIGITAL CONTENT INCLUDING HAIR COLOR CHANGES ONTO A USER'S HEAD, FACE, OR BODY

(71) Applicant: L'Oreal, Paris (FR)

(72) Inventors: Panagiotis-Alexandros Bokaris, Paris (FR); Michael Haddad, Paris (FR); Loic Tran, Paris (FR)

(73) Assignee: L'Oreal, Paris (FR)

( * ) Notice: Subject to any disclaimer, the term of this patent is extended or adjusted under 35 U.S.C. 154(b) by 225 days.

(21) Appl. No.: 17/438,357

(22) PCT Filed: Mar. 13, 2020

(86) PCT No.: PCT/EP2020/056896
§ 371 (c)(1),
(2) Date: Sep. 10, 2021

(87) PCT Pub. No.: WO2020/182996
PCT Pub. Date: Sep. 17, 2020

(65) Prior Publication Data
US 2022/0191441 A1    Jun. 16, 2022

(30) Foreign Application Priority Data
Mar. 13, 2019   (EP) ..................... 19305302

(51) Int. Cl.
*H04N 9/31*    (2006.01)
*G06T 7/50*    (2017.01)
(Continued)

(52) U.S. Cl.
CPC ......... *H04N 9/3182* (2013.01); *A45D 44/005* (2013.01); *G01B 11/22* (2013.01);
(Continued)

(58) Field of Classification Search
CPC ...... H04N 9/3182; H04N 9/3185; G06T 7/50; G06T 2207/30201; G06V 40/171;
(Continued)

(56) References Cited

U.S. PATENT DOCUMENTS

2005/0134599 A1* 6/2005 Nayar ................. G06T 3/00
345/589
2018/0101173 A1* 4/2018 Banerjee ................ G06T 7/70
(Continued)

FOREIGN PATENT DOCUMENTS

| JP | 2002-083286 A | 3/2002 |
| JP | 2002083286 A  | 3/2002 |

(Continued)

OTHER PUBLICATIONS

Japanese Office Action dated Sep. 16, 2022, issued in related Japanese Application No. 2021-554763 filed Mar. 13, 2020, 8 pages.
(Continued)

*Primary Examiner* — Abderrahim Merouan
(74) *Attorney, Agent, or Firm* — Christensen O'Connor Johnson Kindness PLLC

(57) ABSTRACT

In an embodiment, a virtual hair coloration system includes: a projector 22 configured to project digital content including a makeup application tutorial onto the user's hair; and a dynamic mapping unit 24; 30 operably coupled to the projector, wherein the dynamic mapping unit is configured to establish a dynamic correspondence between pixels of the projector 22 and features of the user's hair.

14 Claims, 11 Drawing Sheets

(51) Int. Cl.
*G06V 40/16* (2022.01)
*G06V 10/77* (2022.01)
*G01B 11/22* (2006.01)
*G01S 17/89* (2020.01)
*A45D 44/00* (2006.01)

(52) U.S. Cl.
CPC .............. *G01S 17/89* (2013.01); *G06T 7/50* (2017.01); *G06V 10/7715* (2022.01); *G06V 40/171* (2022.01); *H04N 9/3185* (2013.01); *G06T 2207/30201* (2013.01)

(58) Field of Classification Search
CPC .. G06V 10/7715; A45D 44/005; G01B 11/22; G01S 17/89
See application file for complete search history.

(56) References Cited

U.S. PATENT DOCUMENTS

| 2018/0121713 | A1* | 5/2018 | Guo | G06V 40/172 |
| 2022/0183447 | A1* | 6/2022 | Bokaris | G06T 17/20 |

FOREIGN PATENT DOCUMENTS

| JP | WO2015008756 | A1 | | 1/2015 | |
| JP | WO2015008756 | A1 | | 3/2017 | |
| JP | 2018-195996 | A | | 12/2018 | |
| KR | 2017-0135758 | A | | 12/2017 | |
| KR | 20170135758 | A | | 12/2017 | |
| WO | 2015008756 | A1 | | 1/2015 | |
| WO | WO-2015008756 | A1 | * | 1/2015 | ........... A63F 13/215 |

OTHER PUBLICATIONS

Christian Siegl et al., "FaceForge: Markless Non-Rigid Face Multi-Projection Mapping", IEEE Transactions on Visualization and Computer Graphics, vol. 23, No. 11, Nov. 2017, pp. 2440-2446, https://ieeexplore.ieee.org/document/8007312.

International Preliminary Report on Patentability, PCT/EP2020/056896, dated Sep. 23, 2021, 17 pages.

Hanhoon Park et al., "Simultaneous Geometric and Radiometric Adaptation to Dynamic Surfaces with a Mobile Projector-Camera System," IEEE Transactions on Circuits and Systems for Video Technology, Institute of Electrical and Electronics Engineerd, US, vol. 18, No. 1, Jan. 1, 2008, pp. 110-115.

Bantita Treepong et al., "Makeup Creativity Enhancement with an Augmented Reality Face Makeup System," Computers in Entertainment, vol. 16, No. 4, Article 6 (Nov. 2018), 17 pages.

Kazumasa Suzuki, et al., "Video-Rate Hair Tracking System Using Kinect," CCIW, Jan. 2013, vol. 7786, pp. 212-223.

Robert Williams, "ModiFace Adds 3-D Hair Color Simulation to AR APP,", Mobile Marketer, Sep. 25, 2017, <https://www.mobilemarketer.com/news/modiface-adds-3-d-hair-color-simulation-to-ar-app/505707>, retried on Dec. 3, 2019, 2 pages.

M. Zollhofer, et al., "State of the Art on Monocular 3D Face Reconstruction, Tracking, and Applications," Computer Graphics Forum, vol. 37, No. 2, May 1, 2018, 28 pages.

Invitation to Pay Additional Fees, PCT/EP2020/056896, dated May 18, 2020, 24 pages.

Extended European Search Report dated Jan. 19, 2023, issued in corresponding European Application No. 22199825, 8 pages.

Hanhoon Park et al., "Simultaneous Geometric and Radiometric Adaption to Dynamic Surfaces With a Mobile Projector-Camera System", IEEE Transactions on Circuits and Systems for Video Technology, Institute of Electrical and Electronics Engineers, US, vol. 18, No. 1, Jan. 1, 2008, pp. 110-115.

Bantita Treepong et al., "Makeup Creativity Enhancement with an Augmented Reality Face Makeup System", Computers in Entertainment, vol. 16, No. 4, Nov. 12, 2018, pp. 1-17.

Kazumasa Suzuki et al., "Video-Rate Hair Tracking System Using Kinect", Faculty of Systems Engineering, Wakayama Japan, CCIW 2013, vol. 7786, pp. 212-223, Springer-Verlag Berlin Heidelberg.

M. Zollhofer et al., "State of the Art on Monocular 3D Face Reconstruction, Tracking, and Applications", Computer Graphics Forum, vol. 37, No. 2, May 1, 2018, pp. 523-550, John Wiley & Sons Ltd.

Robert Williams, "ModiFace adds 3-D hair color simulation to AR app", Mobile Marketer, Sep. 25, 2017, pp. 1-2, www.moblemarketer.com/news/modiface-adds-3-d-hair-color-simulation-to-ar-app/505707/.

* cited by examiner

SYSTEMS, DEVICES, AND METHODS FOR PROJECTING DIGITAL CONTENT INCLUDING HAIR COLOR CHANGES ONTO A USER'S HEAD, FACE, OR BODY

CROSS-REFERENCE TO RELATED APPLICATION

This application is a national stage of International Application No. PCT/EP2020/056896, filed Mar. 13, 2020, which claims the priority to European Patent Application No. 19305302.2, filed Mar. 13, 2019; the contents of both are hereby incorporated by reference in their entirety.

SUMMARY

In one embodiment, a virtual hair coloration system includes: a projector configured to project digital content including a makeup application tutorial onto the user's hair; and a dynamic mapping unit operably coupled to the projector, wherein the dynamic mapping unit is configured to establish a dynamic correspondence between pixels of the projector and features of the user's hair.

In one aspect, the dynamic correspondence between the pixels of the projector and features of the user's hair is a first dynamic correspondence, and the dynamic mapping unit is configured to establish a second dynamic correspondence between the pixels of the projector and features of the user's face.

In one aspect, the system also includes a dynamic distortion compensation unit operably coupled to the projector, where the dynamic distortion compensation unit is configured to compensate, in real-time, at least one of color distortions and geometrical distortions of the user's facial surface or the user's hair.

In one aspect, the dynamic mapping unit includes a depth camera configured to dynamically determine a depth contour of the user's facial surface or the user's hair.

In another aspect, the depth camera includes at least one of a time-of-flight sensor and a Doppler-effect transducer configured to determine the depth contour of the user's hair.

In one aspect, the dynamic mapping unit includes a coaxial optics setup having a beam splitter, where the beam splitter is configured to direct an image of the user's facial surface or an image of the user's hair to a camera of the dynamic mapping unit, and where the projector is configured to project digital content including the makeup application tutorial onto the user's hair.

In one aspect, the camera is a 2D camera, and the dynamic mapping is configured to establish the dynamic correspondence between individual pixels of the projector and features of the user's facial surface irrespective of a depth contour of the user's face or the user's hair.

In one aspect, the projector is configured to project at least a first virtual object and a second virtual object, the second virtual object indicative of different environmental lighting condition from the first virtual object.

In one aspect, the dynamic correspondence with the depth-resolved digital representation of the user's hair includes the dynamic correspondence with at least one facial landmark.

In one aspect, the dynamic correspondence with the depth-resolved digital representation of the user's hair includes the dynamic correspondence with at least one partial three-dimensional representation of the user's hair.

In one aspect, the dynamic correspondence with the depth-resolved digital representation of the user's hair includes the dynamic correspondence with at least one of a facial landmark, a wrinkle, a skinfold, or an anatomical feature in a facial image.

In one embodiment, a method of projecting digital content including a makeup application tutorial onto a user includes: establishing, by a dynamic mapping unit, a dynamic correspondence between pixels of a projector and features of a user's hair, where the dynamic mapping unit is operably coupled to the projector; and projecting, by the projector, digital content including the makeup application tutorial onto the user's hair.

In one aspect, establishing, by the dynamic mapping unit, the dynamic correspondence between pixels of the projector and features of the user's hair includes projecting a light pattern that comprises a structured light projection, a structured code projection, a light strip projection, a spatially-encoded pattern, a temporally-encoded pattern or a reference image projection.

In one aspect, establishing, by the dynamic mapping unit, the dynamic correspondence between pixels of the projector and features of the user's hair includes generating a depth-resolved digital representation of at least a portion of the user's hair.

In one aspect, projecting digital content including the makeup application tutorial includes projecting digitally generated, content representative of a hair styling process.

Figure 1:
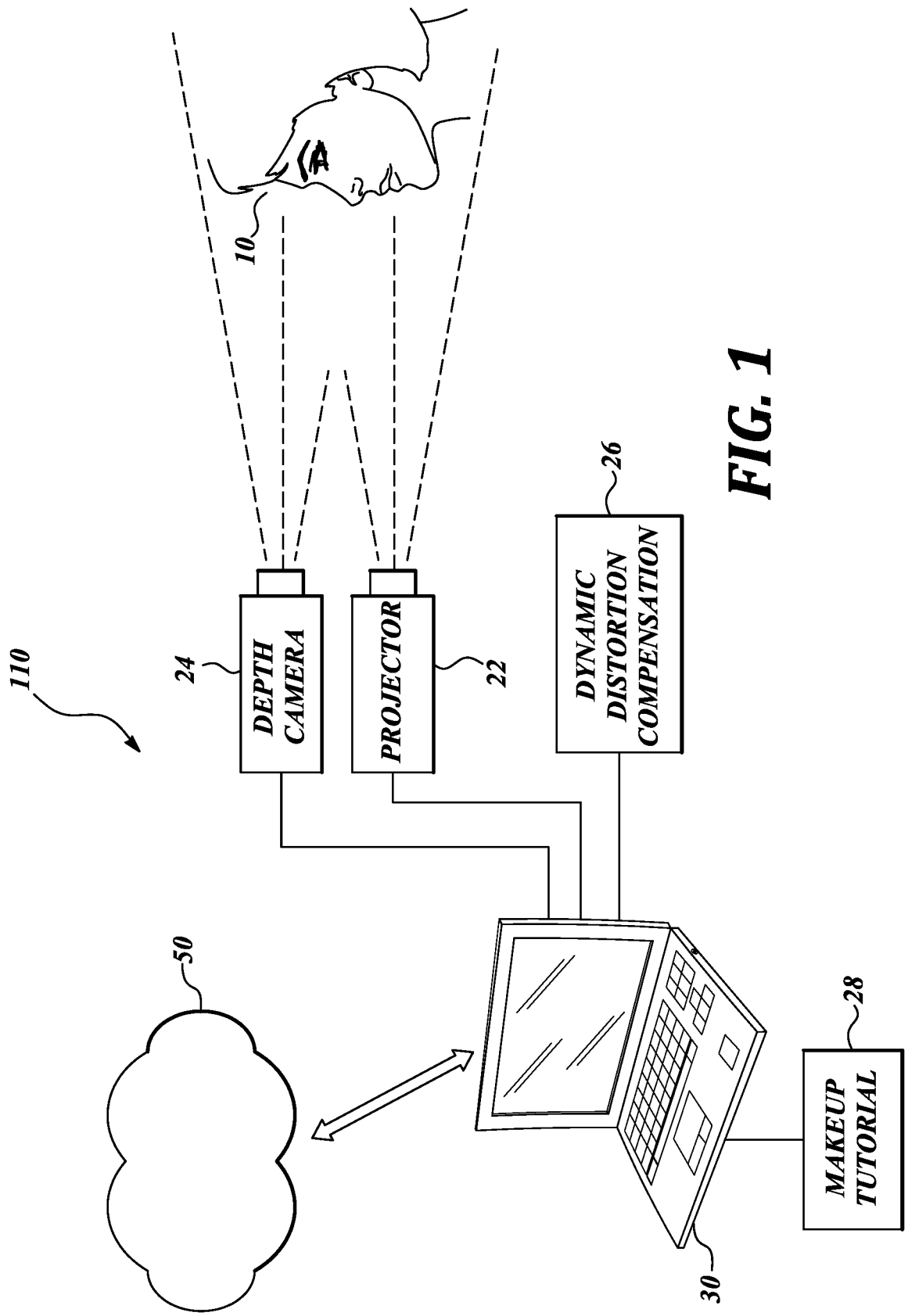
FIG. 1 is a schematic view of a digital content projection system according to one embodiment of inventive technology.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

DETAILED DESCRIPTION

FIG. 1 is a schematic view of a digital content projection system 110 according to one embodiment of inventive technology. In different embodiments, the system 110 (e.g., a digital content projection system, an augmented reality system, a makeup tutorial system, a virtual hair coloration system, or the like) may include one or more methodologies or technologies that are implemented through, for example, projecting digital content onto a user, projecting digital hair content onto a user, projecting digital makeup content onto the user's head, face, or body portion, generating augmented realty content, or the like. For brevity and conciseness, these digital content projection systems, augmented reality systems, makeup tutorial systems, and/or virtual hair coloration system are herein referred to as the makeup tutorial systems.

In the illustrated embodiment, a depth camera 24 acquires a depth-resolved image of user's 10 face. In different embodiments, the depth camera 24 and appropriate image processing software (e.g., carried by the processing unit 30 and/or the camera 24 itself) is referred to as a dynamic mapping unit. In an embodiment, the depth camera 24 includes a depth sensor and circuitry configured to track in real-time at least a partial three-dimensional or two-dimensional representation of the user's head, face, or body portion. The image(s) acquired by the depth camera 24 may be processed by a processing unit 30 (e.g., computer, smart phone, digital controller, etc.) to resolve the depth and outline of user's face.

The depth camera 24 establishes a geometric calibration, since models are created (e.g., within the processing unit 30) for the projector 22 and the depth camera 24. Based on the model and through calibration, the parameters of these models can be estimated. Thus, using the live depth input and the models parameters the system 110 can dynamically (e.g., for each frame) establish correspondence between the projections of the projector 22 and the depth outlines acquired by the depth camera 24.

In an embodiment, a projector 22 is configured to generate a projection of a digital cosmetic application onto user's face. In operation, pixels of the digital projector 22 can track in real-time one or more landmarks/features of the user's face, as captured and resolved by the depth camera 24. The projector 22 may also be connected with the processing unit 30 for coordination with the depth and outline of user's face obtained by the depth camera 24.

In an embodiment, the system 110 is configured to calibrate the projector and camera for real-time projections. In an embodiment, a depth sensor is operable to assess the three-dimensional (3D) positions of the camera pixels. In an embodiment, calibration between the depth camera 24 and the projector 22 can be achieved using different solutions. For example, starting from an optical model for the projector and the camera (which is the same but the light direction is opposite), a set of correspondences between two-dimensional (2D) points on the projector and camera images and 3D points in the scene are required to tune the parameters of the optical model. The shared principle is that the projector projects some coded information and the camera captures and decodes this information.

There are different methods to code this information (temporally/spatially encoded) and different assumptions on the setup and the number of poses required. As non-restrictive examples, some methods use a calibration target on which the coded information is projected, others just project on an arbitrary scene and in some cases the projection can be made on a planar surface. Using a planar surface may provide better results than the arbitrary scene (which may suffer from outliers due to pure decoding on complex surfaces, inter-reflections, etc.) while a projection on a planar surface may still provide a large set of robust points.

In an embodiment, the system 110 includes a dynamic distortion compensation unit 26. In different embodiments, the dynamic distortion compensation unit 26 adjusts for, for example, different pose of user's face, contortion of the face, movement of the lips, blinking of the eye, shaking of the hair, etc., such that the projector 22 accounts for these dynamic changes on the user 10. In different embodiments, the dynamic distortion compensation unit 26 compensates in real-time for illumination and geometrical distortions associated with the projected digital content (possibly including the distortions associated with the makeup application tutorial). In one embodiment, the dynamic distortion compensation may include projecting dots, lines, shapes, areas, etc. on the face or hair of the user by the projector 22. In some embodiments, the dynamic distortion compensation unit 26 is operably coupled to the projector 22 to compensate, in real-time, at least one of color distortions and geometrical distortions of the user's facial surface. In some embodiments, the dynamic distortion compensation unit 26 executes corrections after the face is mapped (by, e.g., the depth camera 24) to enhance user experience. For example, photometric compensation may compensate for the different colors of the user's face in order to create a desired effect. Furthermore, the distortion compensation can be applied in using both the depth camera 24 of the system 110 and a coaxial optics system of the system 120 (shown in FIG. 2).

In some embodiments, a makeup tutorial 28 may project a digital content makeup content (e.g., through the digital projector 22) onto user's facial surface. Such digital content makeup content may include facially-mapped and digitally-generated content representative of a makeup application process, for example, the instructions for applying makeup, hair coloring or hair styling. In some embodiments, the makeup tutorial may be projected onto one eye as a guide, while the real makeup is being applied onto another eye. In different embodiments, multiple scenarios may be projected onto the face. For example, one set of makeup for a daytime wearing can be projected onto one side of the face, while another set of makeup for an evening event may be projected onto another side of the face.

During operation, the system 110 may extract the shape and topology of the face of the user by the depth camera 24, and may project a personalized makeup tutorial directly on the user's face by the projector 22. The user can use a mirror to see the projection. In an embodiment, the makeup routine is gradually projected by defining the application zones of each product to be applied. In an embodiment, the user can apply real makeup using these zones. In an embodiment, the makeup application is digitally implemented (e.g., the projector 22 is a digital projector). In an embodiment, user 10 interacts with an interface to proceed to the next product or to modify the experience. In an embodiment, the user can check the success of the application of a real product by comparing it with the projected virtual application zone.

In some embodiments, the user interacts with the system through an interface (tablet, smartphone, etc.). For various applications, the user may interact with an interface in order to take decisions on the projected content. For example, the user may select one from various proposed experiences (makeup tutorials, fun projection, storytelling, hair coloration, etc.), modify the experience (tuning the makeup, etc.), or control the process (go to or skip the next step, provide feedback that she/he finished the current session, etc.). This interface can be connected to the projected-camera system by either WiFi or through cable integrated in a final product.

Data acquired by the depth camera 24, data projected by the projector 22, algorithms for data processing, makeup tutorials, etc., may be stored on the processing unit 30 or on a remote ("data cloud") system 50—collectively, data storage systems. As described herein, the data storage systems may be any suitable device(s) configured to store data for access by a computing device. An example of the data storage system is a high-speed relational database management system (DBMS) executing on one or more computing devices and being accessible on the data cloud 50 over a high-speed network. However, other suitable storage techniques and/or devices capable of providing the stored data in response to queries may be used, and the computing device may be accessible locally instead of over a network, or may be provided as a cloud-based service. The cloud storage system 50 may also include data stored in an organized manner on a computer-readable storage medium.

Calibration Between Projector and Camera

An accurate calibration between the projector 22 and a depth sensor of the depth camera 24 is important for the real-time projection. Moreover, the depth camera 24 provides the 3D positions of the camera pixels. In some embodiments, the depth sensor may be configured separately from the depth camera 24.

Starting from an optical model for the projector 22 and the depth camera 24 (which may be the same but the light direction is opposite), a set of correspondences between 2D points on the projector and camera images and 3D points in the scene are required to tune the parameters of the optical model. The shared principle is that the projector 22 projects some coded information and the depth camera 24 captures and decodes this information. There are different methods to code this information (temporally/spatially encoded) and different assumptions on the setup and the number of poses required. Some methods use a calibration target on which the coded information is projected, others just project on an arbitrary 3D surface or a planar surface. The reason for using the planar surface is that it gives better results than the arbitrary scene (which suffers from outliers due to pure decoding on complex surfaces, interreflections etc.), and is still convenient to use providing a huge set of robust points.

Some non-exclusive examples of the depth sensors for the depth camera 24 are the RealSense D415, Intel RealSense, Microsoft Kinect, Qualcomm Depth Sensor, and Asus Xtion Pro. For example, the first version Microsoft Kinect uses disparity sensors whereby a structured light pattern is projected (in infrared wavelength) and according to the displacement of this pattern, the depth is computed through disparity. As another example, the second version of Microsoft Kinect uses time-of-flight (still in infrared) to measure the time that projected light needs to reflect from the 3D objects in the scene to estimate distance to the objects. As yet another example, the Intel Realsense D series uses two sensors (stereo module) for the 3D reconstruction that is performed through triangulation. Furthermore, an optional projection of dotted infrared light provides extra texture to improve the triangulation.

Figure 2:
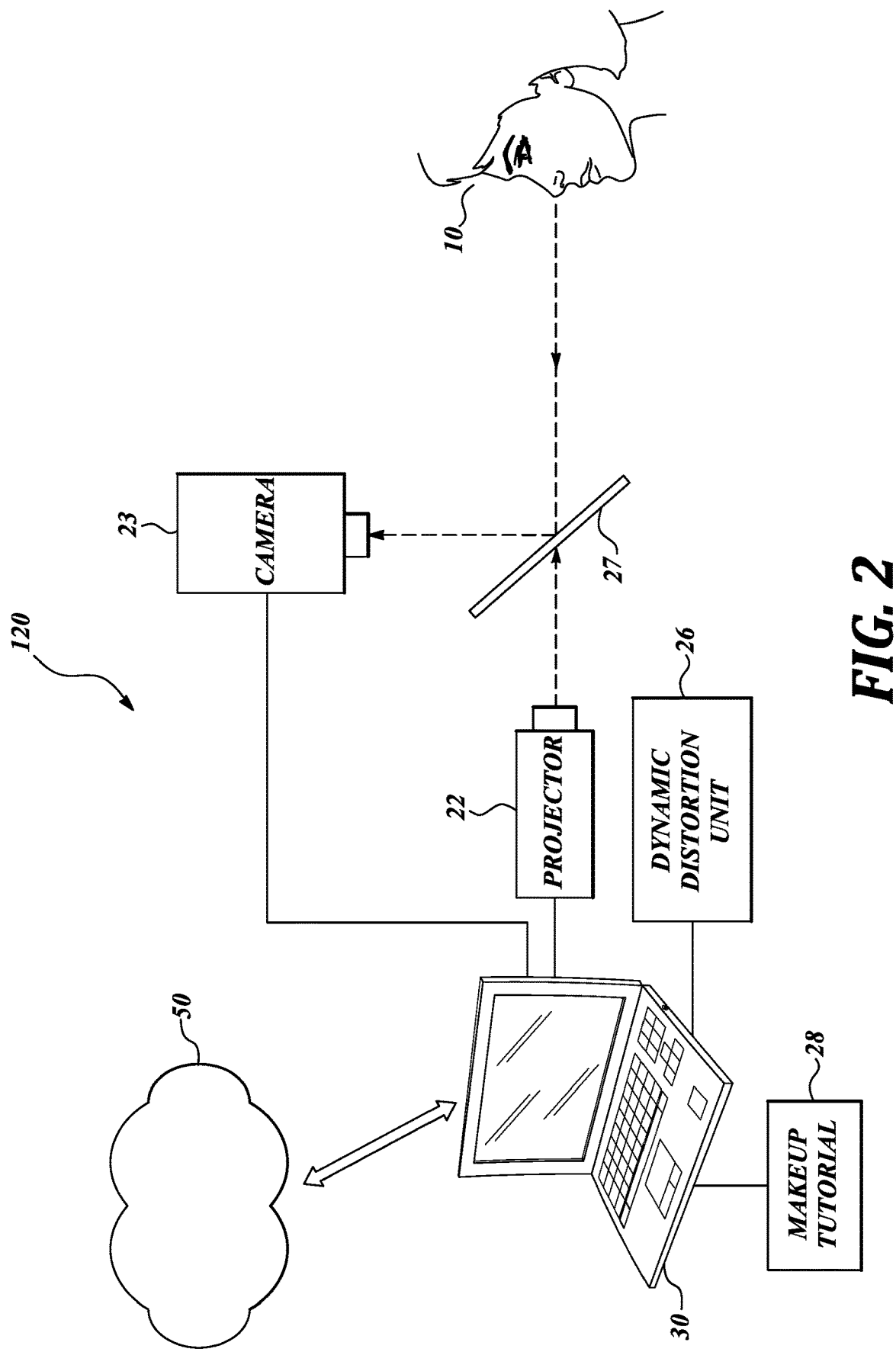
FIG. 2 is a schematic view of a digital content projection system according to one embodiment of inventive technology.

FIG. 2 is a schematic view of a digital content projection system 120 (e.g., a digital content projection system, an augmented reality system, a makeup tutorial system, a virtual hair coloration system, or the like) according to one embodiment of inventive technology. In some embodiments, the digital content projection system 120 is referred to as a coaxial optics setup having a beam splitter 27. The beam splitter 27 may be capable of directing image of the user 10 toward a camera 23, which may be a 2D camera. The beam splitter 27 can also allow digital projections from the projector 22 (e.g., makeup application scenarios, hair styling scenarios, makeup tutorials, etc.) to project onto the user 10.

In operation, we need a dynamic correspondence between the pixels of the projector 22 and the camera 23. In some embodiments, the coaxial optics system 120 may bypass the depth information due to a property of coaxial optics that a correspondence between the projector 22 and the camera 23 is depth-independent. Hence, it may be enough to register the correspondence between the projector and the camera once, since this correspondence remains unchanged with the moving scenes. In some embodiments, the parameters of the model do not need be computed. Instead, a relatively simpler process of calibration (e.g., establishing correspondence between the pixels of the camera 23 and the projector 24) is performed. Using the depth camera of the system 110 of FIG. 1, a 3D scene may be established, which is useful for determining, e.g., facial features of the real 3D space. However, the coaxial optics of the system 120 of FIG. 2 is generally faster due to less communication delay in the system. Furthermore, in some embodiments, it is possible to fit 3D models on the 2D representation of the camera 23, thus making the system 120 achieve almost the same functionality as the depth camera system 110.

Figure 3A:
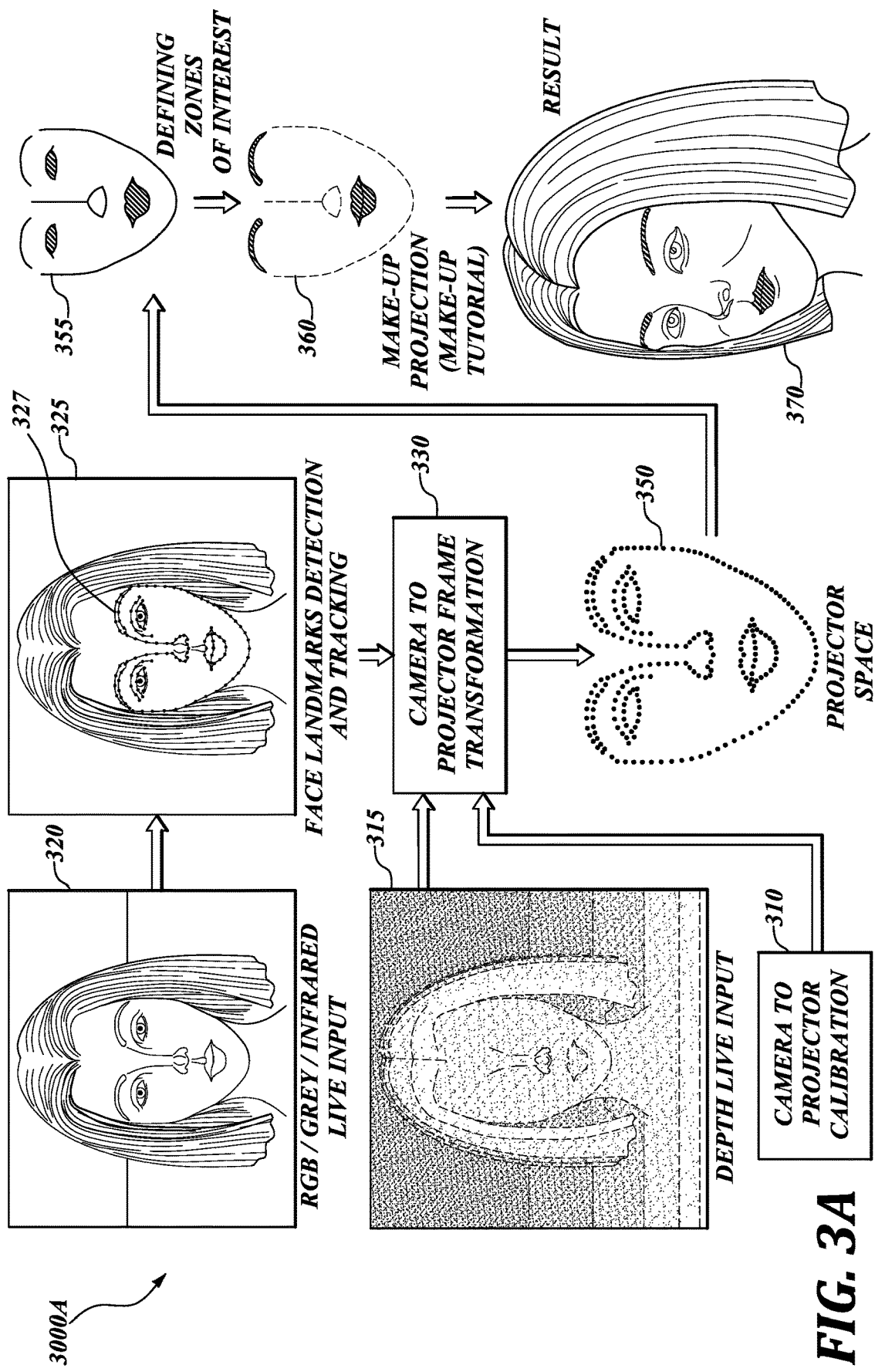
FIGS. 3A-3C are schematic diagrams of digital content projection methods for makeup applications according to embodiments of inventive technology.
Figure 3B:
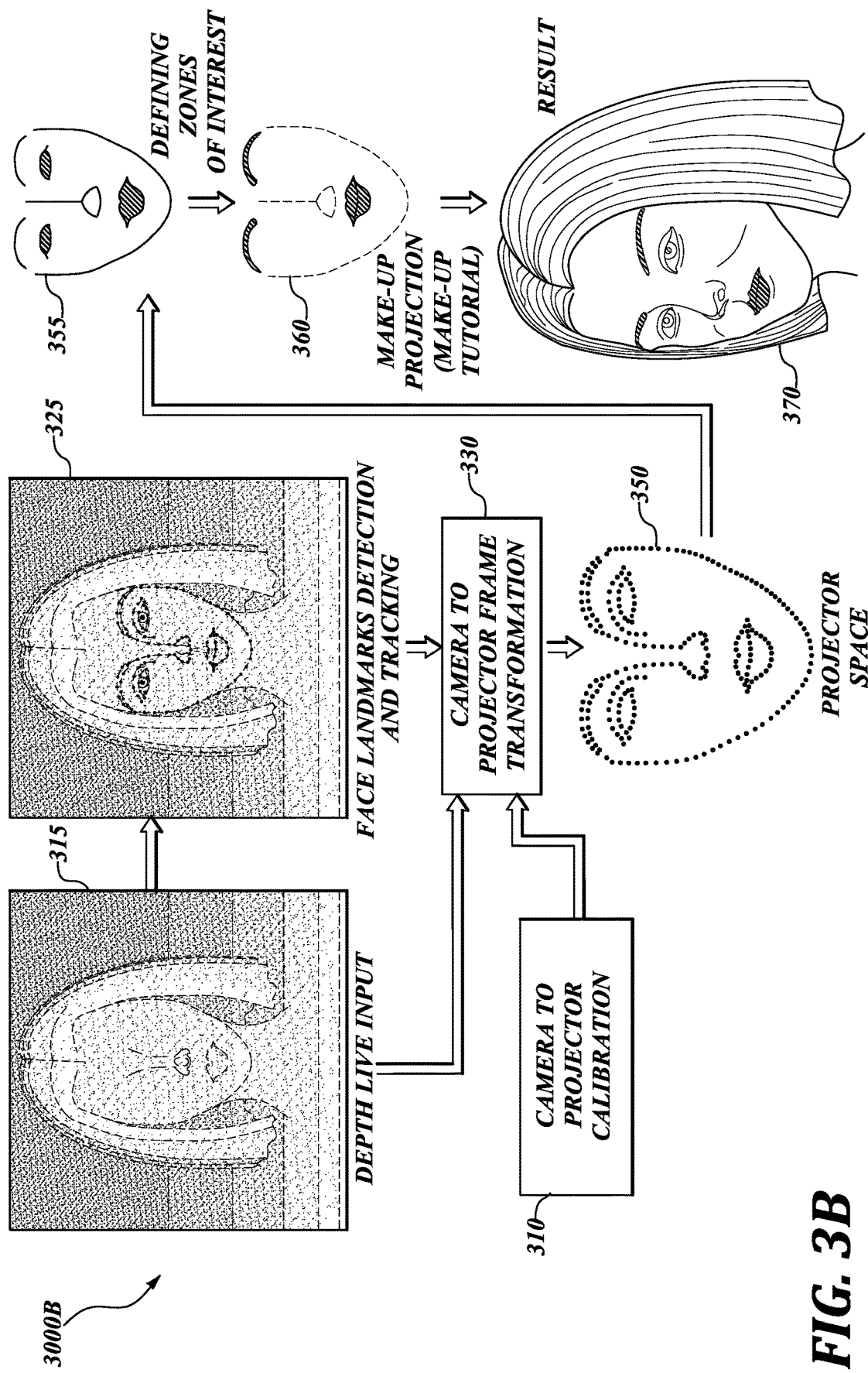
Figure 3C:
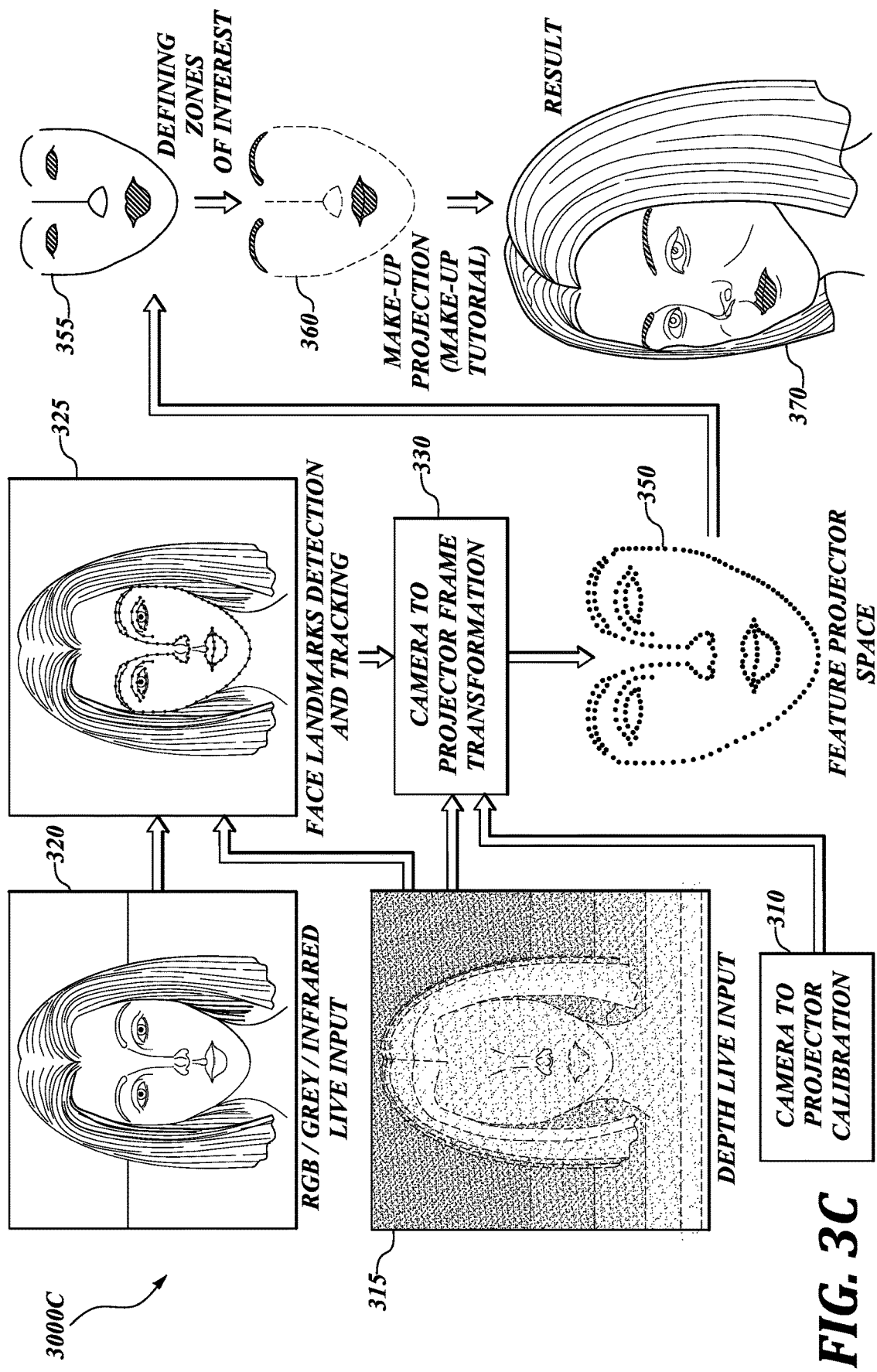

FIGS. 3A-3C are schematic diagrams of digital content projection methods for makeup applications according to embodiments of inventive technology. In some embodiments, the method may include only some of the steps in the FIGS. 3A-3C, or may include additional steps that are not illustrated. In FIG. 3A, method 3000A is an embodiment of the inventive technology for projecting makeup on the user's face. With the illustrated method 3000A, a group of landmarks on the user's face are tracked on camera images. In particular, in block 320 a red/green/blue (RGB), gray scale or infrared live input is acquired by a camera (e.g., the camera 24). In block 325, a set of face landmarks (marked by the dots) are identified and tracked based on the live input acquired by camera in block 320. Features 327 are non-limiting examples of such landmarks. In block 315, a depth live input of the user's face and/or hair is acquired by, for example, the camera 24. In block 310, the camera and projector are mutually calibrated. In block 330, inputs from the blocks 310, 315 and 355 are combined to achieve camera-to-projector frame transformation. In block 350, the projector space is generated having a set of face features outlined and prepared for defining zones of interest. In block 355, zones of interest are defined based upon projector space 350. For example, one or more sub spaces of the projector space 350 may be filled with the projection of makeup displayed over the face of user. In block 360, the makeup projection is outlined. In some embodiments, the makeup projection 360 may be based on a makeup tutorial. In block 370, the makeup projection 360 is applied over the face of the user. In some embodiments, the user may observe the makeup projection 316 on a mirror, a tablet or a similar device. Furthermore, the user may exchange different appearances in the makeup tutorial to, for example, better understand and decide among different choices.

In FIG. 3B, method 3000B is an embodiment of the inventive technology for projecting makeup on the user's face. The steps of the method 3000B are based on a depth image obtained in block 315. In block 325, face features are detected and tracked based upon the death image obtained in block 315. In some embodiments, the remaining steps of the method 3000B are analogous those of the method 3000A.

In FIG. 3C, method 3000C is an embodiment of the inventive technology for projecting makeup on the user's face. In the illustrated embodiment, the face landmarks are detected and tracked using both 2D camera and 3D camera images (blocks 320 and 315, respectively). Therefore, the depth live input of block 315 is fed into block 325, where face landmarks detection and tracking is affected, and into block 330, where the camera-to-projector frame transformation is affected.

Figure 4A:
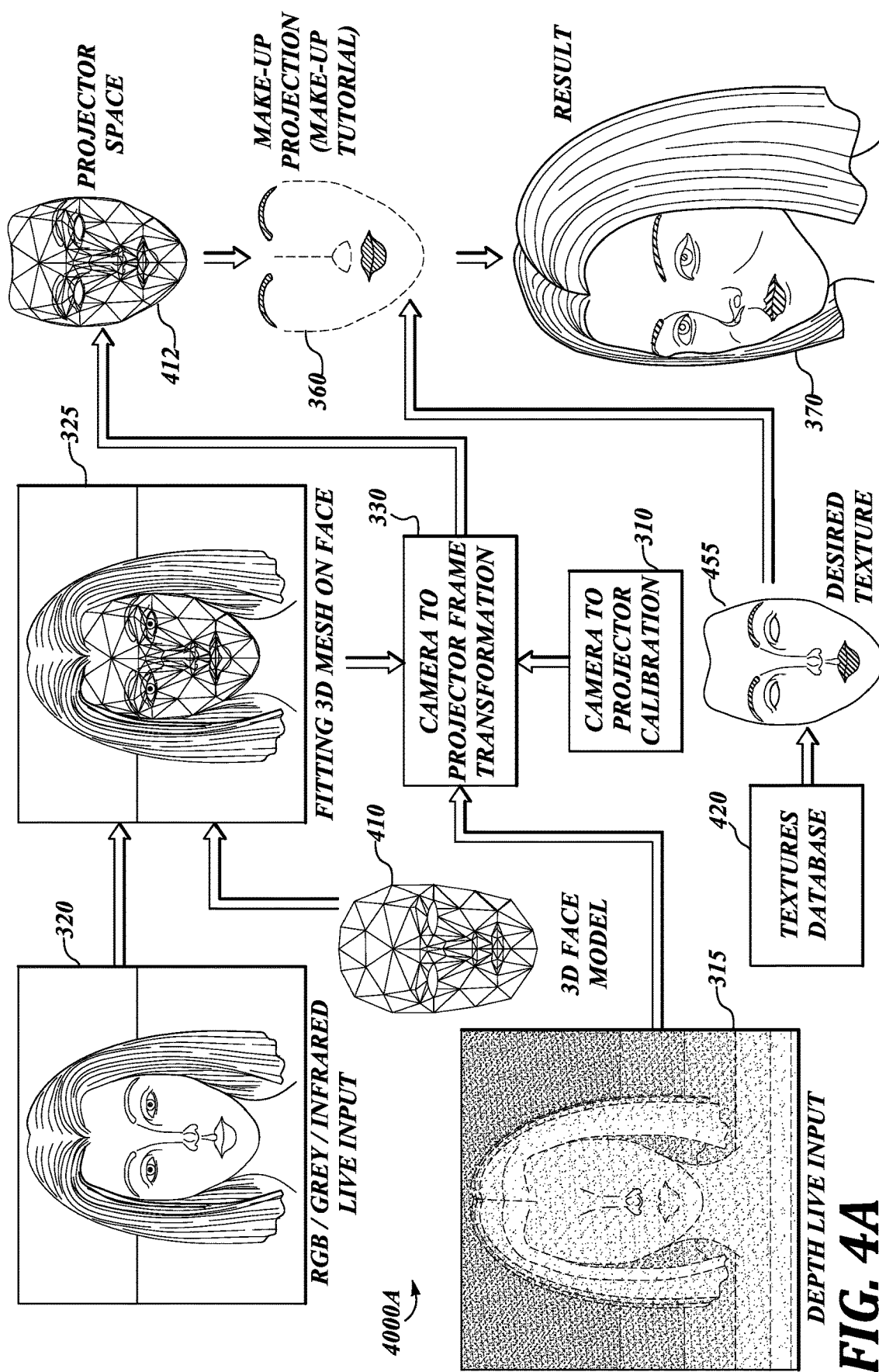
FIGS. 4A-4C are schematic diagrams of digital content projection methods for makeup applications according to embodiments of inventive technology.
Figure 4B:
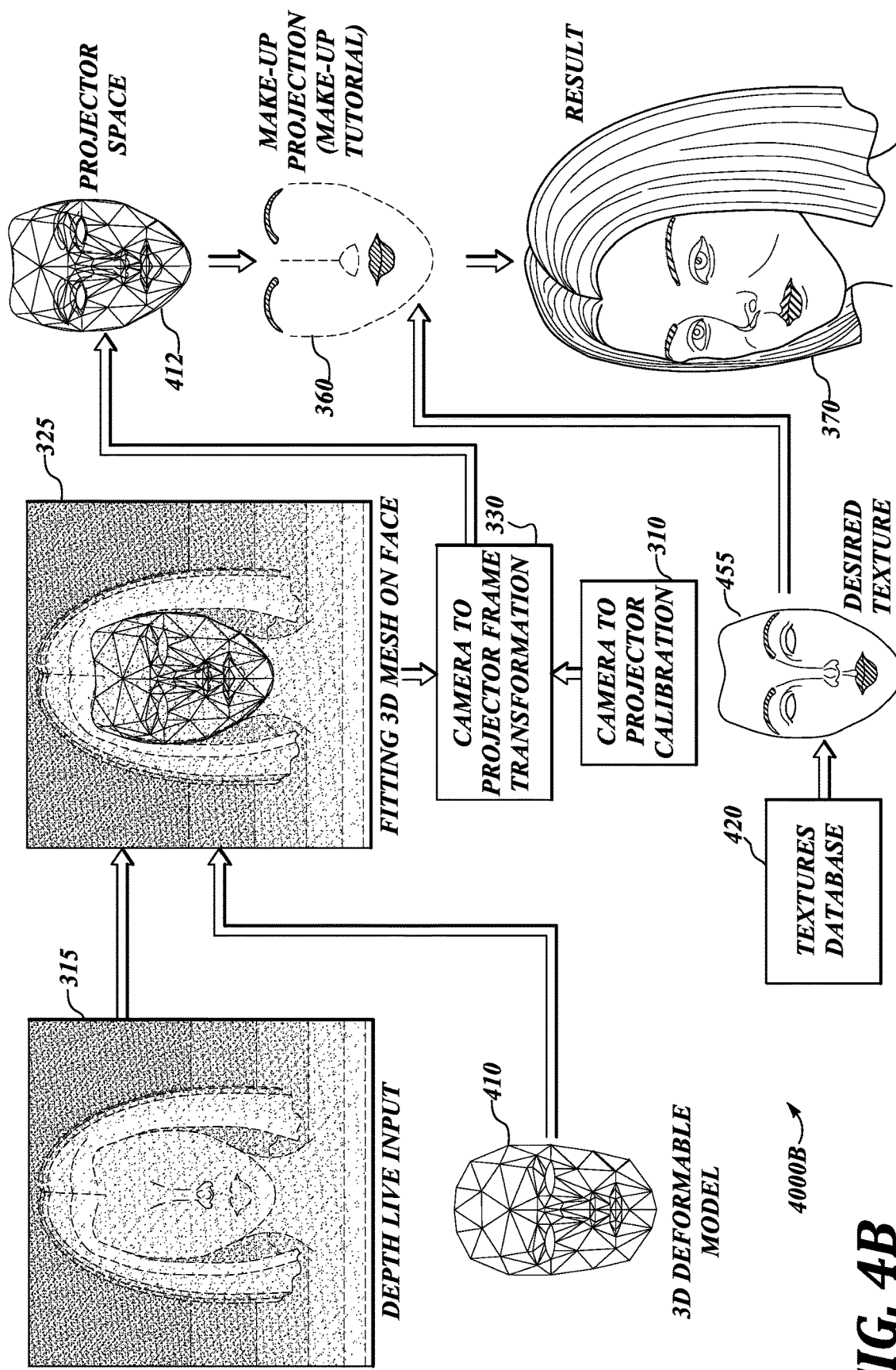
Figure 4C:
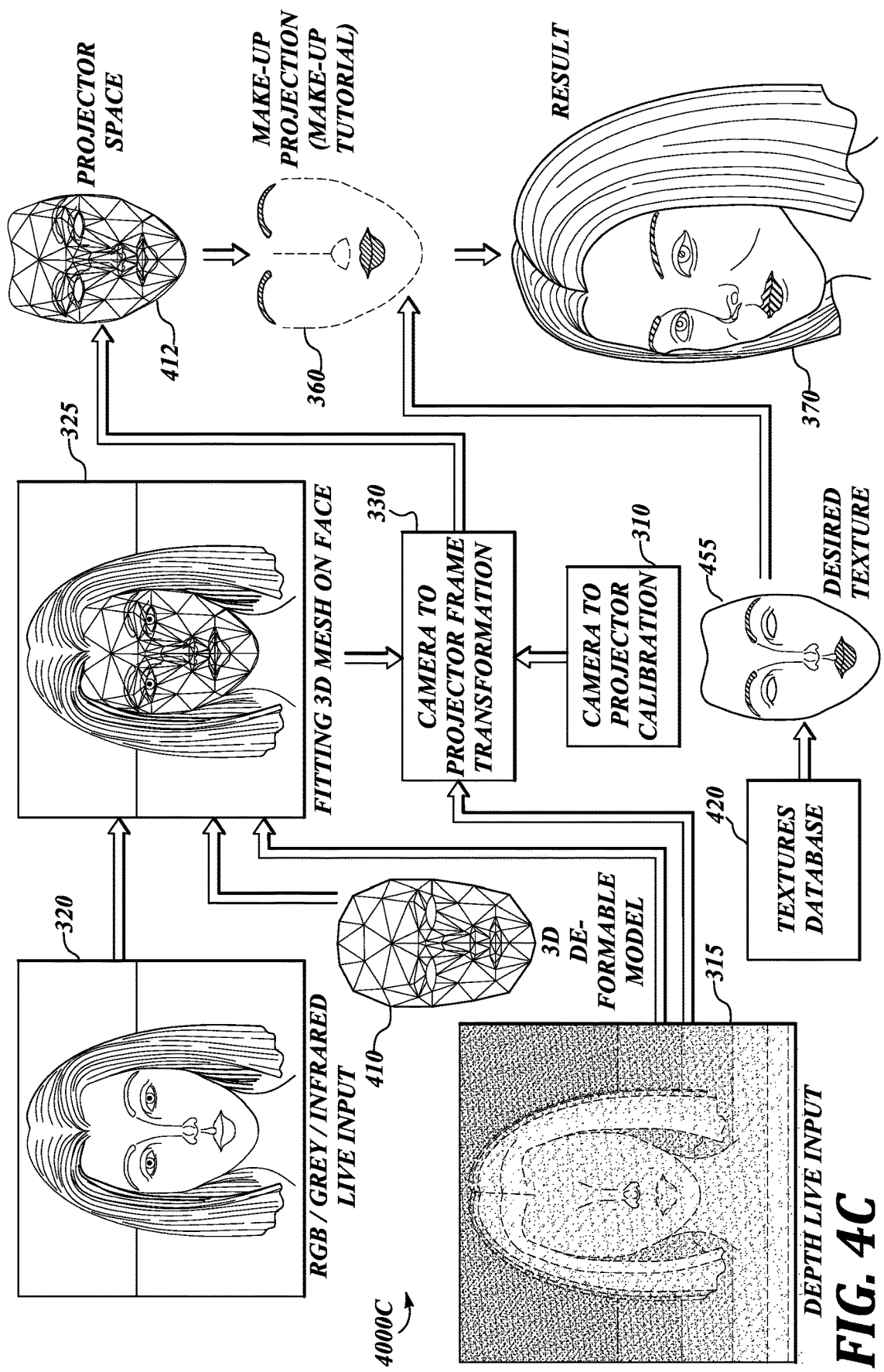

FIGS. 4A-4C are schematic diagrams of digital content projection methods for makeup applications according to embodiments of inventive technology. In some embodiments, the method may include only some of the steps in the FIGS. 4A-4C, or may include additional steps that are not illustrated. In FIG. 4A, method 4000A is an embodiment of the inventive technology for projecting makeup on the user's face. In block 410, a 3D face model (also referred to as a 3D deformable model) is generated. In block 325, the 3D face model is fitted over an image of the face of user. In block 412 projector space that includes the 3D face model is generated. In block 420, the database with the makeup textures is accessed, and the desired texture is overlaid over an image of the user's face. This desired texture is applied to the makeup projection of the block 360 in conjunction with the projector space of the block 412. In some embodiments, landmarks may be optionally fitted before fitting 3D mesh.

In FIG. 4B, method 4000B is an embodiment of the inventive technology for projecting makeup on the user's face. In block 325, a 3D mesh is overlaid over the representation of the user's face obtained in block 315 (e.g., by the depth camera 24). In the illustrated embodiment, fitting and tracking of 3D face mesh is based on the death image. In some embodiments, the landmarks may be optionally fitted before fitting the 3D mesh.

In FIG. 4C, method 4000C is an embodiment of the inventive technology for projecting makeup on the user's face. With the method 4000C, fitting and tracking of a 3D face mesh includes both the camera image and the depth images. For example, block 330, that includes camera to projector frame transformation, is based upon the depth live input of the block 315, camera input of the block 320 and a 3D deformable model of the block 410.

Figure 5A:
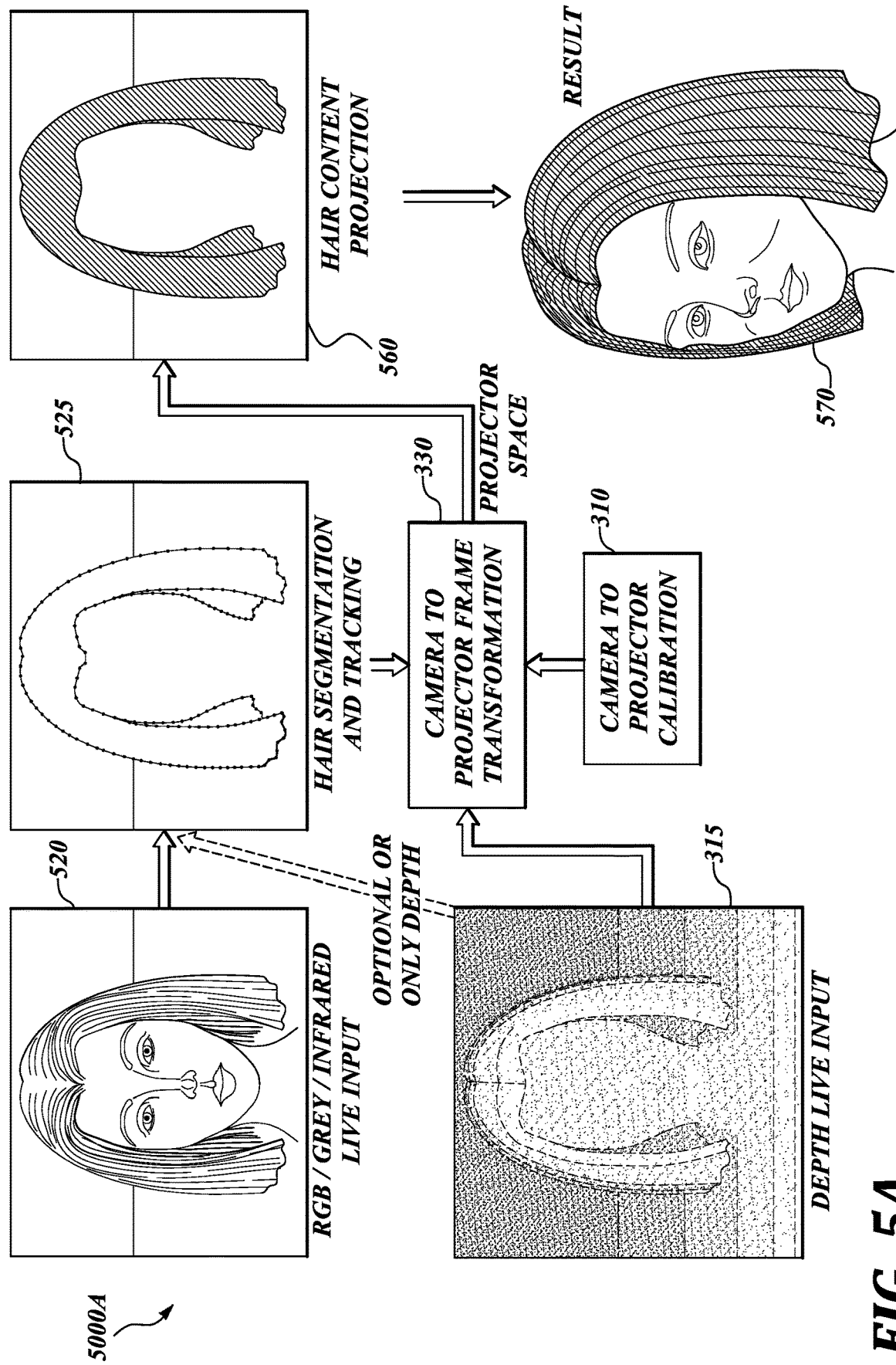
FIGS. 5A and 5B are schematic diagrams of digital content projection methods for hair coloring or hair styling applications according to embodiments of inventive technology.
Figure 5B:
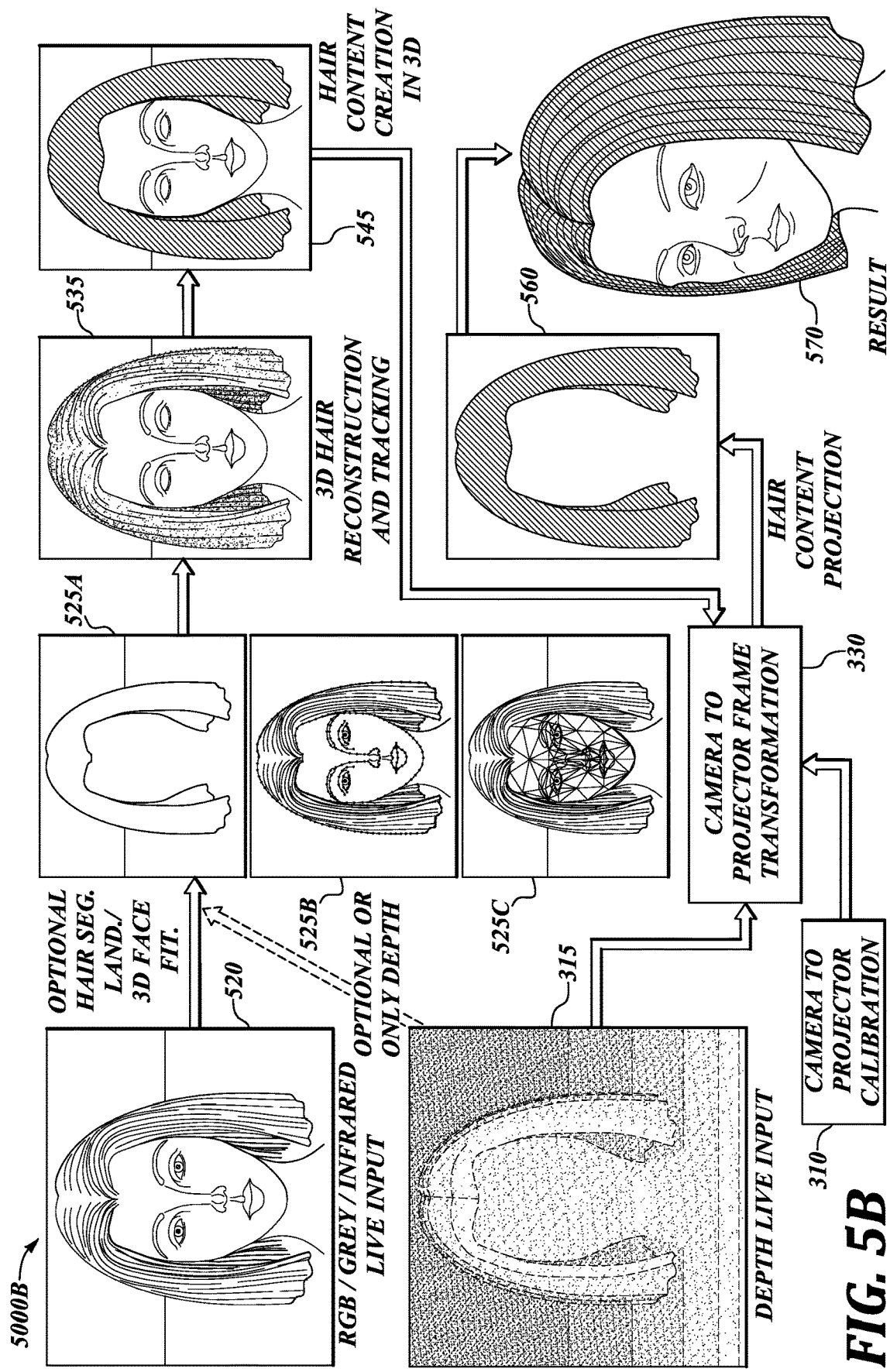

FIGS. 5A and 5B are schematic diagrams of digital content projection methods for hair coloring or hair styling applications according to embodiments of inventive technology. In some embodiments, the method may include only some of the steps in the FIGS. 5A and 5B, or may include additional steps that are not illustrated. In FIG. 5A, method 5000A is an embodiment of the inventive technology for projecting a hair coloring and/or hair styling application (also referred to as "virtual hair coloration") onto user's hair. In block 520, a camera input of the user's face and hair is obtained. In block 315, a depth live input of the user's face and/or hair is acquired by, for example, the camera 24. This live input may be provided to block 330, where a camera to projector frame transformation is affected, and to block 525, where her segmentation and tracking is affected. In block 560, the projector 22 may project her content onto the hair segmentation and tracking outline of the block 525. The resulting overlay of the health content projection over the hair of the user is shown in block 570. In different embodiments, the health content projections of the block 560 may, for example, include different colors and/or different hairstyles.

In FIG. 5B, method 5000B is an embodiment of the inventive technology for projecting a hair coloring and/or hair styling application (also referred to as "virtual hair coloration") onto user's hair. In block 520, a camera input of the user's face and hair is obtained. This camera input of block 520 may be processed in blocks 525A-525B, either alone or in conjunction with the depth live input of the block 315. In block 525A, the camera input of block 520 is converted into a hair segmentation outline. In block 525B, the tracking points (e.g., landmarks 327) are defined. In block 525C, a 3D face model is overlaid over the camera input of block 520. In different embodiments, some or all of the blocks 525A-525C are implemented. In block 535, a 3D hair reconstruction and tracking is affected. In block 545, content is created in a 3D space, and may be fed into the camera-to-projector frame transformation of the block 330. In block 560, a hair content projection is created. In some embodiments, this hair content projection may be at least in part based on the makeup tutorials. The resulting application of the hair content projection over the hair of the user is shown in block 570.

Figure 6:
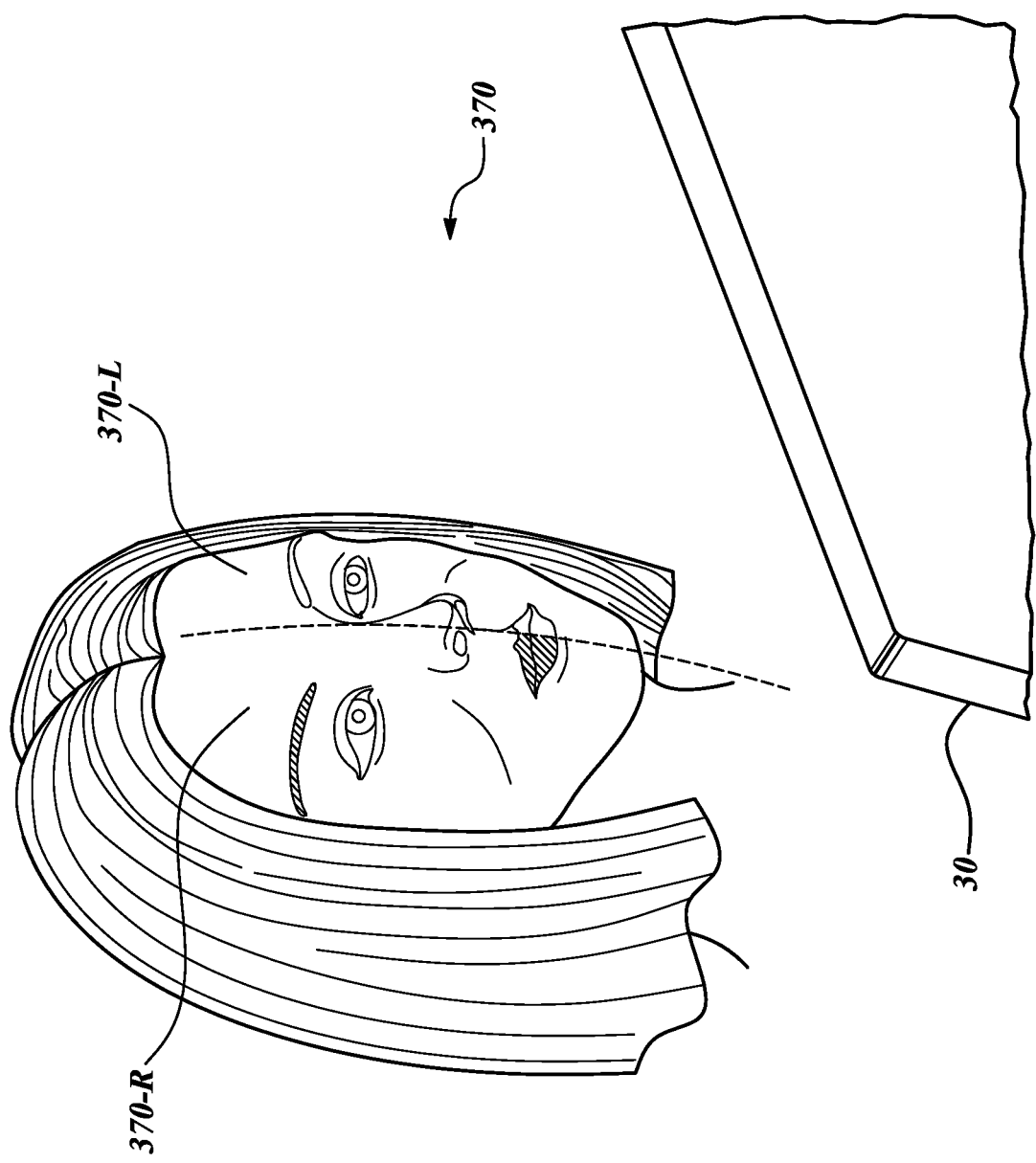
FIG. 6 is a perspective view of a digital content projection system according to one embodiment of inventive technology.

FIG. 6 is a perspective view of a digital content projection system according to one embodiment of inventive technology. In some embodiments, the projector 22 may project makeup projections over, for example, half of the user's face (370-R), while the other half of the user's face is free from the projections. The user 370 may observe the effect of the makeup projection on the mirror, a laptop, a processing unit 30, or other display units. The user may select different makeup embodiments to be projected to find a satisfactory projection. In some embodiments, one type of the makeup (e.g., an evening makeup) is projected on one side of the face, and another type of the makeup (e.g., a daytime makeup) is projected on the other side of the face. In different embodiments, the user may execute an analogues process for the head, with different hairstyles and/or colors attested through different images based on the makeup tutorial. In other embodiments, the user may project makeup on one half of the face and use the projection as a guide for applying the makeup on the other side of the face. In the descriptions herein, the inventive technology may be practiced by a person other than the user, for example, a cosmetologist, a makeup artist, etc.

Face Detection/Reconstruction

The accurate position of face is important since it is a non-rigid surface that needs to be tracked with a certain frequency. This can be done using different methods depending on the applications requirements. Some embodiments of such tracking are described below.

In one embodiment, the landmarks of the face are detected either directly by the RGB camera or by an infrared camera. The latter, if coupled with a filter on the projector that cuts off infrared projection, provides robust landmarks that are not affected by the projected content, which may be useful for some applications.

In another embodiment, a 3D model may be fit on the face using either only the RGB information or by combining the RGB and the depth information. Such an embodiment has an additional computation cost, but, if based on depth, the approach may be more robust against variations on colors on the face due to projection.

In another embodiment, surface of the face may be reconstructed using the depth sensor image and additional detection of landmarks on that surface.

In one embodiments, landmarks may be detected using both the depth and RGB/infrared images as inputs to make the detection more robust to projection. Additionally, a deep learning algorithm could be trained on such a dataset.

In one embodiment, the face of the person (user) may be scanned, and then tracked as combination of expressions (blend shapes) and pose orientation.

In one embodiment, RGB image is used for hair segmentation, using, for example, a deep learning algorithm. In some embodiments, such additional use of depth information makes the segmentation more accurate.

Virtual Content Generation

The generation of the virtual content depends of the application scenario and the method used for face reconstruction/detection. It can be either simply based on the face landmarks and creating desired texture using this 2D topology, or it can be a texture mapped on the 3D face model if the latter is calculated.

In an embodiment, during operation, the systems 110, 120 project digital content onto a user's hair to create the illusion of hair color change. In an embodiment, this effect is combined with makeup projection to decide on optimal combinations. In an embodiment, the user interacts with the systems 110, 120 using an interface with audio or manual inputs or by changing the colors or modifying the texture (highlights, patters, etc.). Some applications of the systems 110, 120 in use are described below.

Makeup projection: Makeup augmentation for easy trying of various products (limited by the environmental conditions). Projected products can be altered to take into account the effect of the physical application at the specific type of skin.

Storytelling: For special events, extreme augmentations can be proposed such as the ones used on stage in theater/concerts to tell a story about a new launch of a brand or for the wow factor these immersive experiences can provide.

Different lighting conditions simulation: The effect of different lighting conditions can be simulated to visualize the appearance of makeup under different conditions (such as nightclub, daylight, office, etc.).

Aging/Deaging simulation: Augment and enhance wrinkles or skin exposure to make the person look older. This can be combined with skin care treatment and diagnosis. On the other hand, using light, wrinkles can be compensated and the person can look younger. This can simulate the expected result using a skin care product.

Optical effects creation: Create and simulate different optical effects on the face surface such as increase glossiness, smooth the face, pearl effect, increase contrast, transparency etc. The subsurface scattering can be modelled and taken into account in such a system in order to create more realistic effects.

Traffic creation: At the Point of Sale, such a system can increase significantly traffic by attracting people to get in the store once by having a system behind the window. They can be augmented with something "fun" once they pass by outside the store.

Augment not only faces but also other objects: augment packaging of products that can be either real products or big mockups for visualization purposes.

Makeup Tutorial

In an embodiment, the system includes a makeup tutorial unit. In an embodiment, the makeup tutorial unit is configured to project digital content including a makeup application tutorial onto the user's facial surface. For example, in an embodiment, the makeup tutorial unit includes a processor and computational circuitry configured to generate projectable makeup tutorial content responsive to receiving one or more parameters associated with a digital representation of the user's facial surface.

In an embodiment, the makeup tutorial unit is configured to generate a projection of a digital cosmetic application that tracks in real-time at least a partial three-dimensional or two-dimensional representation of the user's facial surface. In an embodiment, the makeup tutorial unit 106 is configured to generate a projection of a digital cosmetic application that tracks in real-time to one or more facial landmarks.

In an embodiment, the makeup tutorial unit 106 includes a plurality of controllable light-emitting sources operable to generate a projectable display. For example, in an embodiment, the makeup tutorial unit includes a plurality of controllable light-emitting sources operable to project a makeup application tutorial onto the user's facial surface. Such projections may simulate a plurality of environmental lighting conditions. In an embodiment, the makeup tutorial unit includes a plurality of controllable light-emitting sources operable to project at least a first virtual object and a second virtual object, the second virtual object indicative of different environmental lighting condition from the first virtual object.

Non-limiting examples of controllable light-emitting sources 108 include one or more lasers, laser diodes, light-emitting diodes (LEDs), organic light emitting diodes (OLEDs), polymer light-emitting diodes, arc flashlamps, continuous wave bulbs, or incandescent emitters, and the like. In an embodiment, the makeup tutorial unit has at least one of a red light-emitting source having an average peak emission wavelength ranging from 610 nanometers (nm) to 720 nm, a blue light-emitting source having an average peak emission wavelength ranging from 430 nm to 500 nm, and a green light-emitting source having an average peak emission wavelength ranging from 500 nm to 570 nm.

In an embodiment, the makeup tutorial unit includes a plurality of controllable laser diodes operable to generate a projectable display. In an embodiment, the makeup tutorial unit includes at least one of a red laser diode having an average peak emission wavelength ranging from 610 nm to 720 nm, a blue laser diode having an average peak emission wavelength ranging from 430 nm to 500 nm, and a green laser diode having an average peak emission wavelength ranging from 500 nm to 570 nm.

In an embodiment, the makeup tutorial unit includes a plurality of controllable light-emitting sources and a Digital Micromirror Device (DMD) operable to project facially mapped, digitally generated, content representative of a makeup application process. In an embodiment, the makeup tutorial unit includes a laser diode assembly operable to project a makeup application tutorial onto the user's facial surface responsive to receiving one or more parameters associated with a digital representation of the user's facial surface. In an embodiment, the makeup tutorial unit includes at least one of a laser diode, a dichroic mirror, a mirror, a phosphor wheel, a color wheel, a Digital Micromirror Device (DMD) chip, a prism, or a projection lens assembly.

In an embodiment, the makeup tutorial unit includes at least one liquid crystal display (LCD) projector. In an embodiment, the makeup tutorial unit includes at least one ultra-miniature MEMS mirror operable to scan a modulated laser beam onto the user's facial surface.

Dynamic Distortion Compensation Unit

In an embodiment, the dynamic distortion compensation unit is operably coupled to the makeup tutorial unit, and is configured to compensate in real-time illumination and geometrical distortions associated with the projected digital content including the makeup application tutorial. In an embodiment, the dynamic distortion compensation unit includes a processor and computational circuitry configured to generate one or more illumination calibration parameters or geometrical calibration parameters responsive to receiving one or more inputs indicative of a detected distortion in a structured light projection, a structured code projection, a spatially or temporally-encoded pattern projection, or a light strip projection. In an embodiment, the dynamic distortion compensation unit includes a processor and computational circuitry configured to modulate one or more digital images associated with the projected digital content including the makeup application tutorial responsive to receiving one or more inputs indicative of detected illumination distortions or geometrical distortions associated with the projected project digital content.

Depth-Resolved Image Systems

In an embodiment, the system includes a makeup tutorial unit and a depth-resolved image unit (e.g., depth camera 24 having one or more depth sensors). In an embodiment, the makeup tutorial unit is configured to project a makeup application tutorial onto the user's facial surface responsive to receiving one or more parameters associated with a digital representation of the user's facial surface.

In an embodiment, the depth-resolved image unit is configured to generate a depth-resolved digital representation of a user's facial surface. In an embodiment, the makeup tutorial unit is operably coupled to the depth-resolved image unit and is configured to project a makeup application tutorial onto the user's facial surface responsive to receiving one or more parameters associated with the depth-resolved digital representation of the user's facial surface.

In an embodiment, the depth-resolved image unit includes a processor and computational circuitry configured to generate the depth-resolved digital representation of the user's facial surface responsive to receiving one or more inputs indicative of a detected difference between an emitted light signal and a reflected light signal.

In an embodiment, the depth-resolved image unit includes at least one time-of-flight sensor configured to detected differences between an emitted light signal and a reflected light signal.

In an embodiment, the depth-resolved image unit at least one Doppler-effect transducer.

In an embodiment, the depth-resolved image unit includes a processor and computational circuitry configured to generate the depth-resolved digital representation of the user's facial surface responsive to receiving one or more inputs indicative of a detected distortional change in a projected light pattern.

In an embodiment, the depth-resolved image unit includes at least one of an infrared illuminator, an infrared sensor, an RGB (Red, Green, Blue) sensor, or a monochrome sensor.

In an embodiment, the depth-resolved image unit includes at least one infrared illuminator operable to project an infrared light pattern onto a user's facial surface, and at least one infrared sensor operable to detect distortional changes in the projected infrared light pattern.

In an embodiment, the depth-resolved image unit includes at least one infrared illuminator operable to project a spaced-apart infrared light pattern onto a user's facial surface, and at least one infrared sensor operable to detect distortional changes in the projected spaced-apart infrared light pattern.

In an embodiment, the depth-resolved image unit includes at least a pair of any of RGB (Red, Green, Blue), monochrome, infrared sensors, or the like, operable to estimate depth via triangulation.

In an embodiment, the depth-resolved image unit includes one or more depth sensors. Non-limiting examples of depth sensors include rolling shutter depth sensors, global shutter depth sensors, active depth sensing cameras, Charge Coupled Devices (CCD), Complementary Metal Oxide Semiconductors (CMOS), and the like. Further non-limiting examples of depth sensors include disparity sensors, time-of-flight sensor, stereo sensors, and the like. Further non-limiting examples of depth sensors include Intel RealSense sensors, Microsoft Kinect sensors, Qualcomm Depth Sensor, Asus Xtion Pro sensors, and the like.

In an embodiment, the depth-resolved image unit includes circuitry configured to project a structured light pattern and according to the displacement of this pattern, compute depth based on one or more input indicative of disparity in the structured light pattern. In an embodiment, the depth-resolved image unit includes circuitry configured to detect the time that projected light bounces of the objects in the scene and to determine the distance from the objects. In an embodiment, the depth-resolved image unit includes circuitry including a plurality of sensor (stereo module) configured to reconstruct a user's head, face, or body portion through triangulation. In an embodiment, the depth-resolved image unit includes circuitry configured to project an infrared pattern to provide extra texture to ease the triangulation.

In an embodiment, the depth-resolved image unit includes a plurality of depth sensors, at least one RGB (Red, Green, Blue) sensor, and at least one infrared projector. In an embodiment, the plurality of depth sensors includes at least one rolling shutter depth sensor. In an embodiment, the plurality of depth sensors includes at least one global shutter depth sensor. In an embodiment, the plurality of depth sensors includes at least one Charge Coupled Device (CCD). In an embodiment, the plurality of depth sensors includes at least one Complementary Metal Oxide Semiconductor (CMOS). In an embodiment, the depth-resolved image unit includes at least one active depth sensing camera.

In an embodiment, the depth-resolved image unit includes a processor and computational circuitry configured to extract one or more facial landmarks from the depth-resolved digital representation of a user's facial surface, and to track the one or more of the facial landmarks extracted from the depth-resolved digital representation of the user's facial surface.

In an embodiment, the depth-resolved image unit is configured to extract one or more facial landmarks from the depth-resolved digital representation of a user's facial surface using at least one method of the following categories:

In different embodiments, depth resolved images can be generated by: holistic methods (such as Active Appearance Model (AAM), fitting algorithms or extensions), Constrained Local Model (CLM) methods (such as general or local appearance model, face shape model, detection by optimization etc.) and regression-based methods (direct, cascaded or deep-learning regression).

In an embodiment, the depth-resolved image unit is configured to perform a 3D reconstruction of at least a portion of the user's facial surface from the depth-resolved digital representation of a user's facial surface.

In an embodiment, the depth-resolved image unit is configured to extract one or more facial landmarks of a user's facial surface using any of the RGB, monochrome, infrared, depth live input.

In an embodiment, the depth-resolved image unit is configured to perform a 3D reconstruction of at least a portion of the user's facial surface using any of a RGB, monochrome, infrared, depth live input.

Coaxial Optics Setup

In an embodiment, the makeup tutorial unit is operably coupled to the coaxial optics unit and is configured to project a makeup application tutorial onto the user's facial surface responsive to receiving one or more parameters associated with the detected difference between the project digital content and the target digital content.

In an embodiment, the coaxial optics unit is configured to detect geometric and photometric differences between the projected digital content and the target digital content.

In an embodiment, the coaxial optics unit includes a beam splitter, a camera, and a projector.

In an embodiment, the coaxial optics unit includes a beam splitter, an image sensor, and a Digital Light Processing (DLP) projector.

Tracking Position of User's Face

Face detection/reconstruction: The face accurate position is relevant since it is a non-rigid surface that is typically tracked with a high frequency. This can be done using different methods. Some examples of such methods are listed below.

In some embodiments, the landmarks are detected on the face by the RGB, monochrome, infrared camera, or the like. The latter, if coupled with a filter on the projector that cuts off infrared projection, provides robust landmarks that are not affected by the projected content which is important for some applications.

In some embodiments, a 3D model is fitted on the face using either only the RGB information (for the landmarks) or combining the RGB and the depth information (obtained with depth sensors and technologies). This has an additional computation cost, but, if based on depth, it is more robust against variations on colors on the face due to projection.

In some embodiments, a surface reconstruction of the face uses the depth sensor image and additional detection of landmarks on that surface.

In some embodiments, the landmarks are detected using both the depth and RGB/infrared images as inputs to make the detection more robust to projection. In some embodiments, a deep learning algorithm may be trained on such a dataset.

Some embodiments include scanning the face of the person and then tracking it as a combination of expressions (blend shapes) and pose orientation.

Hair Coloration

In one embodiment, a virtual hair coloration system includes a processor and computational circuitry configured to generate projectable hair color content based at least on input associated with the one or more hair segments.

In one embodiment, the projectable hair color content includes one or more of a projectable hair color, a projectable hair texture, projectable hair color pattern, a projectable hair highlights pattern, In one embodiment, the digital hair projection unit includes a laser diode assembly operable to project at least a first virtual object and a second virtual object, the second virtual object indicative of different hair color condition from the first virtual object.

In one embodiment, the first virtual object comprises a first hair highlight color and the second virtual object comprises a second hair highlight color different from the first hair highlight color.

In one embodiment, the first virtual object comprises a first hair highlight pattern and the second virtual object comprises a second hair highlight pattern different from the first hair highlight pattern.

In one embodiment, the first virtual object comprises a first hair texture pattern and the second virtual object comprises a second hair texture pattern.

In one embodiment, the digital hair projection unit includes a laser diode assembly operable to project at least a first virtual object and a second virtual object, the second virtual object indicative of different environmental lighting condition from the first virtual object.

In one embodiment, the digital hair projection unit includes a laser diode assembly operable to project digital hair color content onto the of a user's head or body portion that mimics a change in hair color or hair texture.

In one embodiment, the digital hair projection unit includes a laser diode assembly operable to project digital hair color content onto the of a user's head or body portion that mimics a change in hair color or hair texture, under a plurality of environmental lighting conditions.

In one embodiment, the digital hair projection unit is further configured to project digital makeup content onto a portion of the user's face or body responsive to receiving one or more parameters associated a segmentation mask.

In one embodiment, a virtual hair coloration method includes: partitioning a digital representation of a user's head, face, or body portion into one or more of hair segments, face segments, skin segments, or background segments; and generating a virtual coloration segmentation mask.

In one embodiment, the virtual hair coloration method of claim 14 also includes generating projectable digital hair content responsive to receiving one or more inputs associated with the virtual coloration segmentation mask.

In one embodiment, the virtual hair coloration method also includes projecting the digital hair content onto a user.

In one embodiment, partitioning the digital representation of the user's head, face, or body portion into one or more of hair segments, face segments, skin segments, or background segments includes detecting one or more objects in digital representation of the user's head, face, or body portion, and In one embodiment, the hair coloration method includes segmenting the objects into one or more of hair segments, face segments, skin segments, or background segments.

In one embodiment, the virtual hair coloration method also includes track at least one of the one or more objects.

In one embodiment, the virtual hair coloration method of claim 14 also includes generating a virtual makeup segmentation mask; and generating projectable digital makeup content responsive to receiving one or more inputs associated with the virtual makeup segmentation mask.

Some embodiments include hair segmentation for some applications using the RGB image (for example a deep learning algorithm), or extra use of depth information to make the segmentation more accurate.

Certain embodiments disclosed herein utilize circuitry to implement, for example, projection protocols, operably couple two or more components, generate information, determine operation conditions, control a device or method, or the like. Circuitry of any type can be used. In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof. In an embodiment, circuitry includes one or more ASICs having a plurality of predefined logic components. In an embodiment, circuitry includes one or more FPGA having a plurality of programmable logic components.

In an embodiment, circuitry includes one or more electric circuits, printed circuits, flexible circuits, electrical conductors, electrodes, cavity resonators, conducting traces, ceramic patterned electrodes, electro-mechanical components, transducers, and the like.

In an embodiment, circuitry includes one or more components operably coupled (e.g., communicatively, electromagnetically, magnetically, ultrasonically, optically, inductively, electrically, capacitively coupled, wirelessly coupled, and the like) to each other. In an embodiment, circuitry includes one or more remotely located components. In an embodiment, remotely located components are operably coupled, for example, via wireless communication. In an embodiment, remotely located components are operably coupled, for example, via one or more communication modules, receivers, transmitters, transceivers, and the like.

In an embodiment, circuitry includes memory that, for example, stores instructions or information. Non-limiting examples of memory include volatile memory (e.g., Random Access Memory (RAM), Dynamic Random Access Memory (DRAM), and the like), non-volatile memory (e.g., Read-Only Memory (ROM), Electrically Erasable Programmable Read-Only Memory (EEPROM), Compact Disc Read-Only Memory (CD-ROM), and the like), persistent memory, and the like. Further non-limiting examples of memory include Erasable Programmable Read-Only Memory (EPROM), flash memory, and the like. In an embodiment, memory is coupled to, for example, one or more computing devices by one or more instructions, information, or power buses.

In an embodiment, circuitry includes one or more computer-readable media drives, interface sockets, Universal Serial Bus (USB) ports, memory card slots, and the like, and one or more input/output components such as, for example, a graphical user interface, a display, a keyboard, a keypad, a trackball, a joystick, a touch-screen, a mouse, a switch, a dial, and the like, and any other peripheral device. In an embodiment, circuitry includes one or more user input/output components that are operably coupled to at least one computing device configured to control (electrical, electro-mechanical, software-implemented, firmware-implemented, or other control, or combinations thereof) at least one parameter associated with, for example, determining one or more tissue thermal properties responsive to detected shifts in turn-ON voltage.

In an embodiment, circuitry includes a computer-readable media drive or memory slot that is configured to accept signal-bearing medium (e.g., computer-readable memory media, computer-readable recording media, and the like). In an embodiment, a program for causing a system to execute any of the disclosed methods can be stored on, for example, a computer-readable recording medium, a signal-bearing medium, and the like. Non-limiting examples of signal-bearing media include a recordable type medium such as a magnetic tape, floppy disk, a hard disk drive, a Compact Disc (CD), a Digital Video Disk (DVD), Blu-Ray Disc, a digital tape, a computer memory, and the like, as well as transmission type medium such as a digital or an analog communication medium (e.g., a fiber optic cable, a waveguide, a wired communications link, a wireless communication link (e.g., receiver, transmitter, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, and the like.

In an embodiment, circuitry includes acoustic transducers, electroacoustic transducers, electrochemical transducers, electromagnetic transducers, electromechanical transducers, electrostatic transducers, photoelectric transducers, radio-acoustic transducers, thermoelectric transducers, ultrasonic transducers, and the like.

In an embodiment, circuitry includes electrical circuitry operably coupled with a transducer (e.g., an actuator, a motor, a piezoelectric crystal, a Micro Electro Mechanical System (MEMS), etc.) In an embodiment, circuitry includes electrical circuitry having at least one discrete electrical circuit, electrical circuitry having at least one integrated circuit, or electrical circuitry having at least one application specific integrated circuit. In an embodiment, circuitry includes electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs.

The invention claimed is:

1. A virtual hair coloration system, comprising:
   a projector (22) configured to project digital content including a makeup application tutorial onto the user's hair; and
   a dynamic mapping unit (24; 30) operably coupled to the projector, wherein the dynamic mapping unit is configured to establish a dynamic correspondence between pixels of the projector (22) and features of the user's hair,
   wherein the dynamic correspondence between the pixels of the projector and features of the user's hair is a first dynamic correspondence,
   wherein the dynamic mapping unit (24; 30) is configured to establish a second dynamic correspondence between the pixels of the projector (22) and features of the user's face, and
   wherein the virtual hair coloration system is configured to:
      partition a digital representation of a user's head into a plurality of hair segments and generate a virtual coloration segmentation mask and,
      generate said projectable hair color content based at least on input associated with the plurality of hair segments, wherein said projectable hair color content includes instructions for applying hair coloring.

2. The system according to claim 1, further comprising:
   a dynamic distortion compensation unit (26) operably coupled to the projector (22), wherein the dynamic distortion compensation unit (26) is configured to compensate, in real-time, at least one of color distortions and geometrical distortions of the user's facial surface or the user's hair.

3. The system according to claim 1, wherein the dynamic mapping unit (24; 30) comprises a depth camera configured to dynamically determine a depth contour of the user's facial surface or the user's hair.

4. The system according to claim 3, wherein the depth camera comprises at least one of a time-of-flight sensor and a Doppler-effect transducer configured to determine the depth contour of the user's hair.

5. The system according to claim 1, wherein the dynamic mapping unit (24; 30) comprises a coaxial optics setup having a beam splitter (27), wherein the beam splitter (27) is configured to direct an image of the user's facial surface or an image of the user's hair to a camera of the dynamic mapping unit, and wherein the projector is configured to project digital content including the makeup application tutorial onto the user's hair.

6. The system according to claim 5, wherein the camera is a 2D camera, and wherein the dynamic mapping (24; 30) is configured to establish the dynamic correspondence between individual pixels of the projector and features of the user's facial surface irrespective of a depth contour of the user's face or the user's hair.

7. The system according to claim 1, wherein the projector (22) is configured to project at least a first virtual object and a second virtual object, the second virtual object indicative of different environmental lighting condition from the first virtual object.

8. The system according to claim 1, wherein the dynamic correspondence with the depth-resolved digital representation of the user's hair includes the dynamic correspondence with at least one facial landmark.

9. The system according to claim 1, wherein the dynamic correspondence with the depth-resolved digital representation of the user's hair includes the dynamic correspondence with at least one partial three-dimensional representation of the user's hair.

10. The system according to claim 1, wherein the dynamic correspondence with the depth-resolved digital representation of the user's hair includes the dynamic correspondence with at least one of a facial landmark, a wrinkle, a skinfold, or an anatomical feature in a facial image.

11. A method of projecting digital content including a makeup application tutorial onto a user, comprising:
    establishing, by a dynamic mapping unit, a dynamic correspondence between pixels of a projector and features of a user's hair, wherein the dynamic mapping unit is operably coupled to the projector; and
    projecting, by the projector, digital content including the makeup application tutorial onto the user's hair,
    wherein the dynamic correspondence between the pixels of the projector and features of the user's hair is a first dynamic correspondence,
    wherein the dynamic mapping unit (24; 30) is configured to establish a second dynamic correspondence between the pixels of the projector (22) and features of the user's face, and
    wherein the method of projecting digital content comprises:
        partitioning a digital representation of a user's head into a plurality of hair segments and generating a virtual coloration segmentation mask, and
        generating said projectable hair content based at least on input associated with the plurality of hair segments, wherein said projectable hair color content includes instructions for applying hair coloring.

12. The method according to claim 11, wherein establishing, by the dynamic mapping unit, the dynamic correspondence between pixels of the projector and features of the user's hair includes projecting a light pattern that comprises a structured light projection, a structured code projection, a light strip projection, a spatially-encoded pattern, a temporally-encoded pattern or a reference image projection.

13. The method according to claim 11, wherein establishing, by the dynamic mapping unit, the dynamic correspondence between pixels of the projector and features of the user's hair includes generating a depth-resolved digital representation of at least a portion of the user's hair.

14. The method according to claim 11, wherein projecting digital content including the makeup application tutorial includes projecting digitally generated, content representative of a hair styling process.

* * * * *